United States Patent
Hayasaka et al.

(10) Patent No.: US 7,932,941 B2
(45) Date of Patent: Apr. 26, 2011

(54) IMAGE PICKUP APPARATUS

(75) Inventors: Kengo Hayasaka, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 12/289,641

(22) Filed: Oct. 31, 2008

(65) Prior Publication Data
US 2009/0128658 A1    May 21, 2009

(30) Foreign Application Priority Data
Nov. 12, 2007 (JP) ................................. 2007-292843

(51) Int. Cl.
- H04N 9/07 (2006.01)
- H04N 5/247 (2006.01)
- H04N 9/09 (2006.01)
- H04N 9/083 (2006.01)
- G03B 13/14 (2006.01)

(52) U.S. Cl. ........ 348/267; 348/264; 348/265; 348/272; 396/377

(58) Field of Classification Search .......... 348/264–267, 348/272–273; 396/377
See application file for complete search history.

(56) References Cited

U.S. PATENT DOCUMENTS

| | | | |
|---|---|---|---|
| 3,971,065 A | 7/1976 | Bayer | |
| 2005/0053274 A1* | 3/2005 | Mayer et al. | 382/154 |
| 2005/0128335 A1* | 6/2005 | Kolehmainen et al. | 348/340 |
| 2005/0175257 A1* | 8/2005 | Kuroki | 382/278 |
| 2007/0052729 A1* | 3/2007 | Fukushima et al. | 345/629 |
| 2007/0252074 A1* | 11/2007 | Ng et al. | 250/208.1 |
| 2009/0174765 A1* | 7/2009 | Namba et al. | 348/46 |
| 2010/0073463 A1* | 3/2010 | Momonoi et al. | 348/47 |

FOREIGN PATENT DOCUMENTS
WO    WO-2006/039486 A2    4/2006

OTHER PUBLICATIONS
R. Ng et al., "Light Field Photography with a Hand-held Plenoptic Camera", Stanford Tech Report CTSR 2005-02, pp. 1-11.

* cited by examiner

*Primary Examiner* — Lin Ye
*Assistant Examiner* — Mekonnen Dagnew
(74) *Attorney, Agent, or Firm* — Rader, Fishman & Grauer PLLC

(57) ABSTRACT

An image pickup apparatus includes an image-pickup lens having an aperture diaphragm, an image-pickup element that has a color filter which is periodically allocated colors in units of a predetermined unit array and that generates picked-up image data including pixel data of colors using received light, the color filter being adjacent to a light receiving surface, a microlens array unit that is arranged on an image forming surface of the image-pickup lens and whose microlenses are each allocated a plurality of pixels of the image-pickup element, and an image processing unit that performs image processing on the picked-up image data generated by the image-pickup element. The image processing unit includes a parallax component image generation unit that generates a plurality of parallax component images and an interpolation processing unit that performs color interpolation processing for each of the parallax component images.

8 Claims, 17 Drawing Sheets

| R | G | R | G | .... |
|---|---|---|---|---|
| G | B | G | B | .... |
| R | G | R | G | .... |
| G | B | G | B | .... |
| ⋮ | ⋮ | ⋮ | ⋮ | |

| G | R | G | R | .... |
|---|---|---|---|---|
| B | G | B | G | .... |
| G | R | G | R | .... |
| B | G | B | G | .... |
| ⋮ | ⋮ | ⋮ | ⋮ | |

| B | G | B | G | .... |
|---|---|---|---|---|
| G | R | G | R | .... |
| B | G | B | G | .... |
| G | R | G | R | .... |
| ⋮ | ⋮ | ⋮ | ⋮ | |

IMAGE PICKUP APPARATUS

CROSS REFERENCES TO RELATED APPLICATIONS

The present invention contains subject matter related to Japanese Patent Application JP 2007-292843 filed in the Japanese Patent Office on Nov. 12, 2007, the entire contents of which are incorporated herein by reference.

BACKGROUND OF THE INVENTION

1. Field of the Invention

The present invention relates to an image pickup apparatus using a microlens array.

2. Description of the Related Art

Various image pickup apparatuses have been proposed and developed. Moreover, image pickup apparatuses that are designed to perform predetermined image processing on picked-up image data obtained by picking up an image and output the processed picked-up image data have been proposed.

For example, an image pickup apparatus using a method called "Light Field Photography" is proposed in PCT Japanese Translation Patent Publication No. 06/039486 and "Light Field Photography with a Hand-Held Plenoptic Camera" (Ren.Ng et al., Stanford Tech Report CTSR 2005-02). This image pickup apparatus includes an image pickup lens, which is a main lens for picking up an image of a shooting subject, an aperture diaphragm, a microlens array in which a plurality of microlenses are arranged, a photoreceptor, and an image processing unit. The picked-up image data obtained from the photoreceptor includes information regarding the intensity distribution of light received by a reception surface of the photoreceptor and also information regarding directions in which light rays propagate. The image processing unit is designed to be able to reconstruct an image obtained for an arbitrary field of view or for an arbitrary focus or a 3-D image.

Moreover, in a case in which a color image is obtained using the image pickup apparatus, in general, a color filter is added onto an image pickup element. As such a color filter, for example, as disclosed in U.S. Pat. No. 3,971,065, a Bayer color filter is often used in which the three primary colors, red (R), green (G), and blue (B), are arranged in a mosaic pattern in the ratio of R:G:B=1:2:1.

SUMMARY OF THE INVENTION

In picked-up image data obtained using light rays that have passed through a color filter of different colors and are received by an image pickup element, for each of the colors, pieces of the pixel data of the color are spatially thinned out. Thus, for each of the colors, it is necessary that interpolation processing such as so-called demosaic processing is executed, so that picked-up image data of the color is obtained in a state in which the picked-up image data is spatially filled with pixel data of the color.

Here, in the technology called "Light Field Photography" described above, since the picked-up image data includes information regarding directions in which light propagates in addition to information regarding the intensity distribution of the light, it is important to separate light rays from each other and detect them. However, in this technology, when a color image is to be obtained using such a color filter described above, if color interpolation processing such as the demosaic processing is performed between adjacent pixels in the picked-up image data, the following problems may occur since light vectors are different between the adjacent pixels.

For example, if an image of an object which causes directivity in terms of light is picked up, interpolation processing is performed using data of pixels having different intensity distribution of light, and thus correct intensity distribution of light is not obtained. Moreover, since light rays coming from different positions (objects) pass through a defocus surface, which is at an out-of-focus position, appropriate color interpolation processing is not performed. Furthermore, when focus adjustment which is unique to this technology is performed, since light vectors become mixed between adjacent pixels, the focus accuracy with respect to images decreases.

Moreover, in the picked-up image data received by the image pickup element, in response to the shape of an aperture of an aperture diaphragm, an image of a shooting subject is formed for each of the microlenses. Thus, a plurality of circular images are arranged in two dimensions in the picked-up image data. When color interpolation processing is performed on such picked-up image data, appropriate color interpolation processing is not performed using a pixel corresponding to the edge (an outer portion) of an image formed by one of the microlenses and a pixel corresponding to the edge (an outer portion) of an image formed by another one of the microlenses.

Thus, when color interpolation processing such as demosaic processing between adjacent pixels is performed on the picked-up image data obtained by the image pickup element, errors in brightness may occur or the color balance may be lost in a reconstructed image because of the above-described problems.

The present invention has been made in light of the above-described problems. It is desirable to provide an image pickup apparatus capable of performing appropriate interpolation processing especially when a color image is obtained using picked-up image data that is obtained so as to include information regarding directions in which light rays propagate.

An image pickup apparatus according to an embodiment of the present invention includes the following elements (A) through (D), (A) an image-pickup lens having an aperture diaphragm, (B) an image-pickup element that has a color filter which is periodically allocated a plurality of colors in units of a predetermined unit array and that generates picked-up image data including pixel data of a plurality of colors using received light, the color filter being adjacent to a light receiving surface, (C) a microlens array unit that is arranged on an image forming surface of the image-pickup lens and whose microlenses are each allocated a plurality of pixels of the image-pickup element, and (D) an image processing unit that performs image processing on the picked-up image data generated by the image-pickup element.

Here, the image processing unit includes a parallax component image generation unit that generate a plurality of parallax component images, each of which is generated by extracting pieces of pixel data that are arranged at the same position in pixel areas corresponding to the microlenses in the picked-up image data and combining the pieces of extracted pixel data that are arranged at the same position and an interpolation processing unit that performs color interpolation processing on each of the parallax component images. Moreover, the color arrangement of the unit array of the color filter is the same as the color arrangement of a unit array of the parallax component images, the unit array containing a plurality of colors.

In an image pickup apparatus according to an embodiment of the present invention, an image of a shooting subject obtained through the image pickup lens is formed on the microlens array unit. Light rays incident on the microlens array unit reach the image pickup element via the microlens array unit, and picked-up image data including information regarding directions in which the light rays propagate in addition to the position information of the light rays is obtained. Here, since the color filter that is periodically allocated a plurality of colors in units of a predetermined unit array is provided on the light receiving surface of the image pickup element, pixel data of a plurality of colors corresponding to the color arrangement of the color filter is obtained as the picked-up image data. In the picked-up image data obtained in this way, a plurality of parallax component images are each generated by extracting and combining pieces of pixel data that are arranged at the same position in the pixel areas corresponding to the microlenses. Here, since the information regarding the positions of light rays and the directions in which the light rays propagate are the same for adjacent pixels in each of the parallax component images, the information regarding the positions of the light rays and the directions in which the light rays propagate are maintained by performing color interpolation processing for each of the generated parallax component images. Moreover, since the color arrangement of a unit array of the color filter is the same as that of a unit array of the parallax component images, the color information regarding the picked-up image data obtained by the image pickup element is not lost.

According to an image pickup apparatus in an embodiment of the present invention, since a color filter that is periodically allocated colors in units of a predetermined unit array is provided adjacent to the light receiving surface of the image pickup element, the picked-up image data including information regarding positions of light rays and directions in which the light rays propagate can be treated as pixel data of a plurality of colors corresponding to the color arrangement of the color filter, the information being obtained by the image pickup element. Moreover, in an image processing unit, since parallax component images are each generated using pieces of pixel data arranged at the same position in pixel areas corresponding to microlenses. Thus, in the parallax component images, the positions of light rays and the directions in which the light rays propagate can be the same for adjacent pieces of pixel data. Thus, color interpolation processing can be performed while the information regarding the positions of the light rays and the directions in which the light rays propagate is appropriately maintained. Moreover, since there is no edge of an image formed in response to the shape of the aperture of an aperture diaphragm for every microlens in the parallax component images, appropriate color interpolation processing can be performed even on the pixel data corresponding to this edge. Here, the color arrangement of a unit array of the color filter is designed to be the same as that of a unit array of the parallax component images, and thus the color information regarding picked-up image data obtained by the image pickup element is not lost. Thus, appropriate color interpolation processing can be performed on the picked-up image data including the information regarding the propagation of light rays. This can prevent errors in brightness from occurring between a reconstructed image and an actual image, and can prevent the color balance from being lost.

BRIEF DESCRIPTION OF THE DRAWINGS

FIGS. 11A through 11C are diagrams schematically showing the color arrangement of generated parallax component images;

DESCRIPTION OF THE PREFERRED EMBODIMENTS

In the following, embodiments according to the present invention will be specifically described with reference to the attached drawings.

First Embodiment

Figure 1:
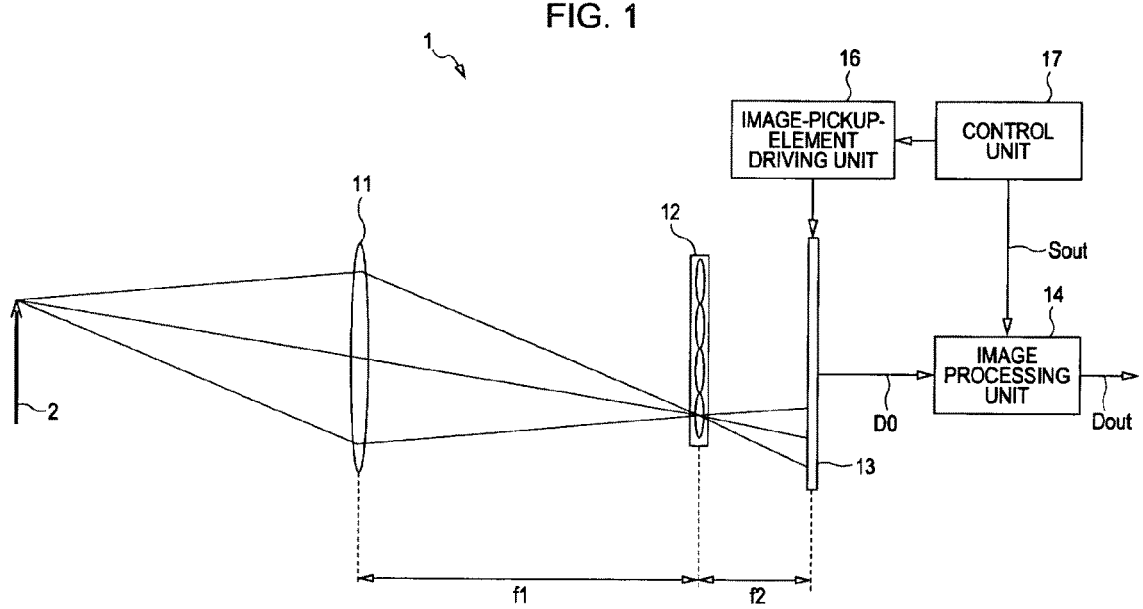
FIG. 1 is a block diagram showing a structure of an image pickup apparatus according to a first embodiment of the present invention.

FIG. 1 shows an overall structure of an image pickup apparatus according to a first embodiment of the present invention (an image pickup apparatus 1). The image pickup apparatus 1 picks up an image of a shooting subject 2 and outputs picked-up image data Dout, and includes an image pickup lens 11, a microlens array 12, an image pickup element 13, an image processing unit 14, an image-pickup-element driving unit 16, and a control unit 17.

The image pickup lens 11 is a main lens for picking up an image of the shooting subject 2, and includes a general image pickup lens, which is used in, for example, video cameras, still cameras, and the like.

The microlens array 12 has a plurality of microlenses arranged in a matrix, and is disposed on an imaging surface of the image pickup lens 11 (a symbol "f1" in FIG. 1 indicates the focal length of the image pickup lens 11). The microlenses are solid lenses, liquid crystal lenses, diffraction lenses, or the like.

The image pickup element 13 is an element that generates picked-up image data D0 by receiving light from the microlens array 12, and is disposed on an imaging surface of the microlens array 12 (a symbol "f2" indicates the focal length of the microlens array 12). This image pickup element 13 is a two-dimensional image pickup element in which a plurality of charge-coupled devices (CCDs) or complementary metal oxide semiconductors (CMOSs) are arranged in a matrix. On the light receiving surface of the image pickup element 13 (the surface adjacent to the microlens array 12), M×N picked-up image pixels (hereinafter simply referred to as pixels) (M and N are integers) are arranged in a matrix. Moreover, one of the microlenses in the microlens array 12 is allocated a plurality of pixels (for example, m×n=11×11=121 pixels). The number of pixels on this light receiving surface is, for example, M×N=3720×2520=9374400. Here, as the value of m and that of n increase, the product of m and n being the number of pixels allocated to each of the microlenses, the resolution of the image pickup element 13 with respect to a reconstructed image described below increases. For example, as the value of m and that of n increase, the resolution of the image pickup element 13 obtained for an arbitrary field of view or in a depth direction based on refocus processing (the resolution of the image pickup element 13 obtained for an arbitrary focus) increases. On the other hand, (M/m) and (N/n) relate to the resolution of the reconstructed image. Thus, as the value of (M/m) and that of (N/n) increase, the resolution of the reconstructed image increases. In this way, there is a trade-off between the resolution of the image pickup element 13 with respect to a reconstructed image and the resolution of the reconstructed image; however, it is desirable that both the resolution of the image pickup element 13 and the resolution of the reconstructed image be as high as possible.

Figure 2:
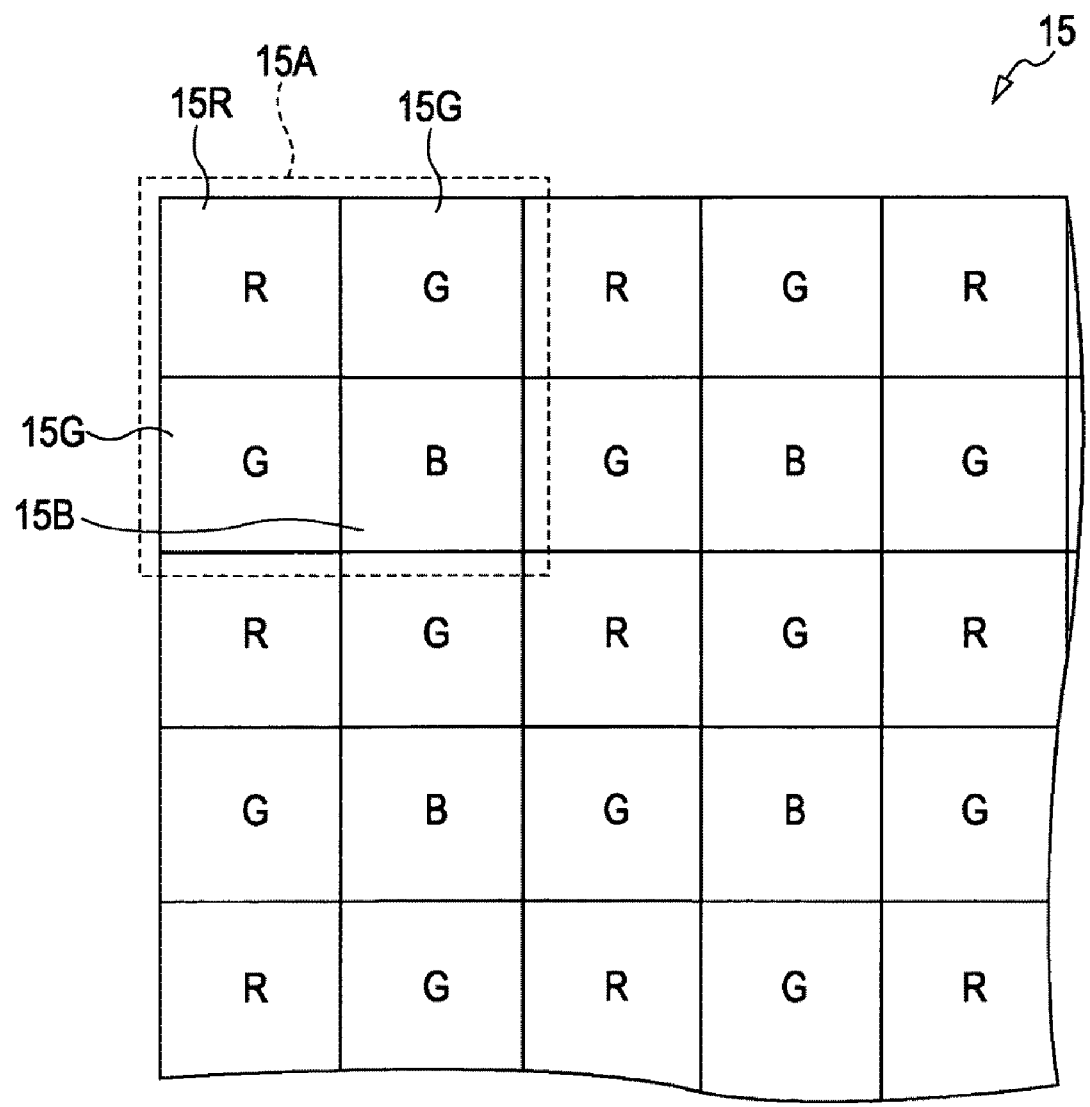
FIG. 2 is a plan view showing an exemplary structure of a color filter provided on a light receiving surface of an image-pickup element shown in FIG. 1.

On the light receiving surface of the image pickup element 13, for example, a color filter 15 as shown in FIG. 2 is disposed (which is not shown in FIG. 1). This color filter 15 is a primary color filter with a Bayer pattern in which three primary color filters (a red color filter 15R, a green color filter 15G, and a blue color filter 15B) for red (R), green (G), and blue (B) are arranged in a mosaic pattern in the ratio of R:G:B=1:2:1. That is, such three color filters are periodically arranged in units of a unit array 15A with two rows and two columns.

Moreover, in the first embodiment of the present invention, the pixels on the light receiving surface of the image pickup element 13 are each allocated one of the colors of the color filter 15. That is, the pixels are each allocated the red color filter 15R, the green color filter 15G, or the blue color filter 15B.

Furthermore, if the larger one of the number of rows and the number of columns for the unit array 15A of the color filter 15 is represented by n (if the number of rows and the number of columns are the same, n is both the number of rows and the number of columns), the number of pixels $N_p$ along one side of a pixel area corresponding to one of the microlenses (a pixel area 13A described below) is expressed by Eq. (1) given below.

$$N_p = (n+1) + n \times m \text{ (where } m=0, 1, 2, 3, \ldots) \quad (1)$$

The image-pickup-element driving unit 16 is a driving unit that drives the image pickup element 13 and controls a light receiving operation thereof.

The image processing unit 14 performs predetermined image processing, which will be described below, on the picked-up image data D0 obtained by the image pickup element 13, and outputs the picked-up image data Dout. By performing sorting according to arithmetic processing using, for example, a technique called "Light Field Photography", an image obtained for, for example, an arbitrary field of view or for an arbitrary focus (a reconstructed image based on the picked-up image data Dout) can be generated. The details of this image processing unit 14 will be described below.

The control unit 17 is a control unit that controls the driving operation of the image-pickup-element driving unit 16 and also controls the image processing operation of the image processing unit 14 using a control signal Sout. This control unit 17 includes, for example, a microcomputer.

Figure 3:
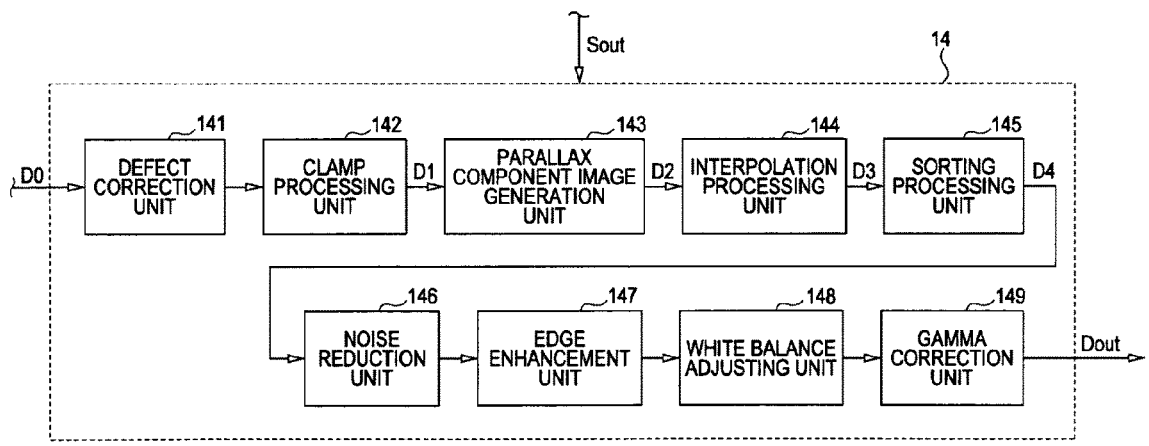
FIG. 3 is a functional block diagram showing an example of a detailed structure of an image processing unit shown in FIG. 1.

Next, the details of the image processing unit 14 will be described with reference to FIG. 3. FIG. 3 shows a functional block structure of the image processing unit 14.

The image processing unit 14 includes a defect correction unit 141, a clamp processing unit 142, a parallax component image generation unit 143, an interpolation processing unit 144, a sorting processing unit 145, a noise reduction unit 146, an edge enhancement unit 147, a white balance adjusting unit 148, and a gamma correction unit 149.

The defect correction unit 141 is a correction unit that corrects a defect such as a defect due to underexposure included in the picked-up image data D0 (a defect due to a malfunction of the image pickup element 13). The clamp processing unit 142 is a unit that performs setting processing of the black level of each pixel data (clamp processing).

The parallax component image generation unit 143 is a generation unit that generates as many pieces of picked-up image data D2 as the number of pixels allocated to one microlens. Each of the pieces of the picked-up image data D2 is generated by extracting pieces of pixel data arranged at the same position in pixel areas corresponding to microlenses from picked-up image data D1 supplied from the clamp processing unit 142, and by combining the pieces of the pixel data extracted from the same position. The details of the operation for generating the picked-up image data D2 will be described later, the operation being performed by the parallax component image generation unit 143.

The interpolation processing unit 144 generates picked-up image data D3 by performing color interpolation processing, for example, demosaic processing, on the picked-up image data D2 supplied from the parallax component image generation unit 143. More specifically, for pixel data of each color, interpolation processing between adjacent pixels is performed in such a manner that the number of pieces of red pixel data obtained through the red color filter 15R, the number of pieces of green pixel data obtained through the green color filter 15G, and the number of pieces of blue pixel data obtained through the blue color filter 15B are to be the same.

The sorting processing unit 145 is a processing unit that generates picked-up image data D4 by performing predetermined sorting processing (sorting processing in which pieces of pixel data are sorted) on the picked-up image data D3 supplied from the interpolation processing unit 144. By performing such sorting processing, a reconstructed image obtained for an arbitrary field of view or for an arbitrary focus can be generated. Here, as preprocessing of the above-described sorting processing, this sorting processing unit 145 performs rearrangement processing in which pieces of pixel data included in the picked-up image data of the parallax component image obtained after the color interpolation processing are arranged at positions corresponding to pieces of pixel data included in the original picked-up image data D0 again.

The noise reduction unit 146 is a unit that performs processing to reduce noises (for example, a noise generated when an image is picked up at a dark place or a place with insufficient exposure), the noises being included in the picked-up image data D4 supplied from the sorting processing unit 145. The edge enhancement unit 147 is a unit that performs edge enhancement processing for enhancing edges of images on the picked-up image data supplied from the noise reduction unit 146.

The white balance adjusting unit 148 is a unit that performs color balance adjustment processing (white balance adjustment processing) on the picked-up image data supplied from the edge enhancement unit 147. The color balance is due to an effect of individual differences of devices such as the transmission characteristics of the color filter 15 or the spectral sensitivity of the image pickup element 13, illumination conditions, or the like.

The gamma correction unit 149 is a correction unit that generates the picked-up image data Dout by performing predetermined gamma correction (correction of brightness or contrast) on the picked-up image data supplied from the white balance adjusting unit 148.

Next, the operation of the image pickup apparatus 1 according to the first embodiment of the present invention will be described with reference to FIGS. 1 through 13.

In the image pickup apparatus 1, an image of the shooting subject 2 obtained through the image pickup lens 11 is formed on the microlens array 12. Light rays incident on the microlens array 12 reach the image pickup element 13 via the microlens array 12, and the picked-up image data D0 is obtained by the image pickup element 13 in accordance with the driving operation performed by the image-pickup-element driving unit 16. Here, since the color filter 15 is provided on the light receiving surface of the image pickup element 13, pixel data of a plurality of colors (three primary colors in this case) corresponding to the colors of the color filter 15 is obtained as the picked-up image data D0 obtained by the image pickup element 13. The picked-up image data D0 obtained by the image pickup element 13 in this way is input to the image processing unit 14.

In the image processing unit 14, predetermined image processing is performed on the picked-up image data D0 in accordance with control of the control unit 17, and thus the picked-up image data Dout obtained after the image processing is output as output data of the image pickup apparatus 1. In the following, with reference to FIGS. 4 through 13, the operation of this image processing unit 14 will be described.

Figure 4:
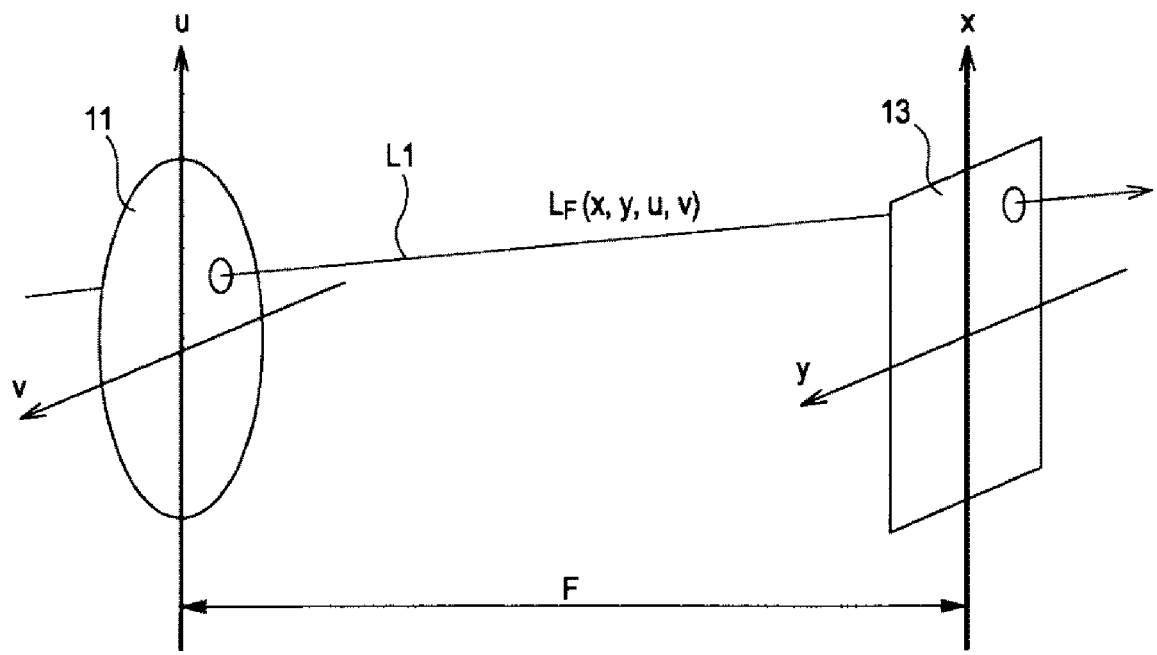
FIG. 4 is a diagram illustrating information regarding a light ray included in picked-up image data.
Figure 5:
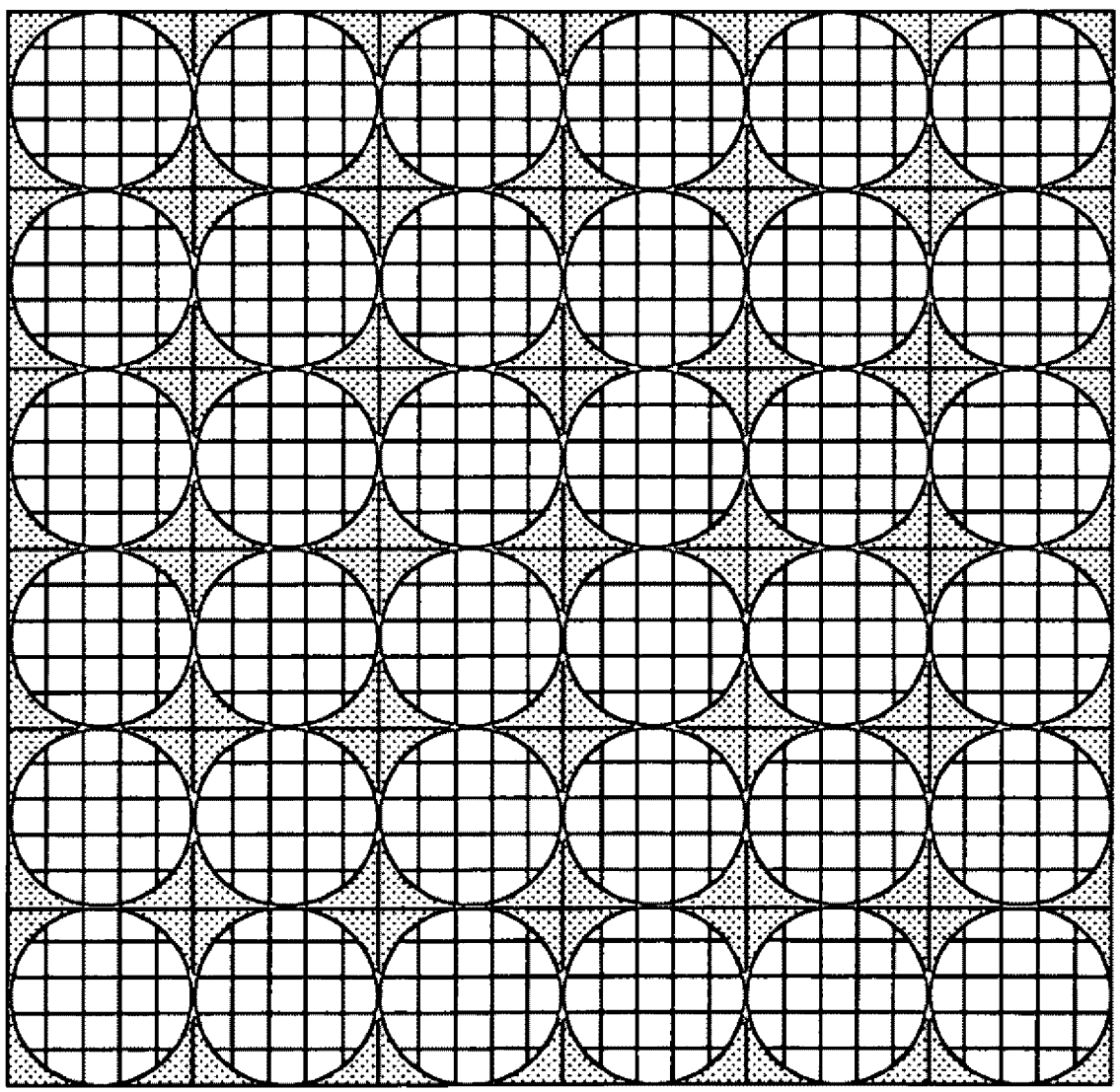
FIG. 5 is a diagram schematically showing an image of a shooting subject, the image being formed on the light receiving surface of the image-pickup element shown in FIG. 1.
Figure 6A:
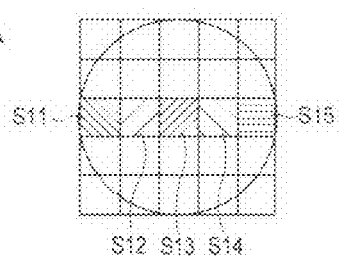
FIGS. 6A and 6B are diagrams illustrating an example of reconstructed images obtained for arbitrary fields of view.
Figure 6B:
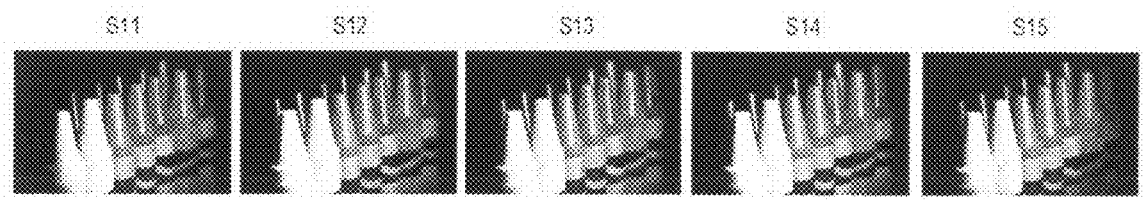
Figure 7:
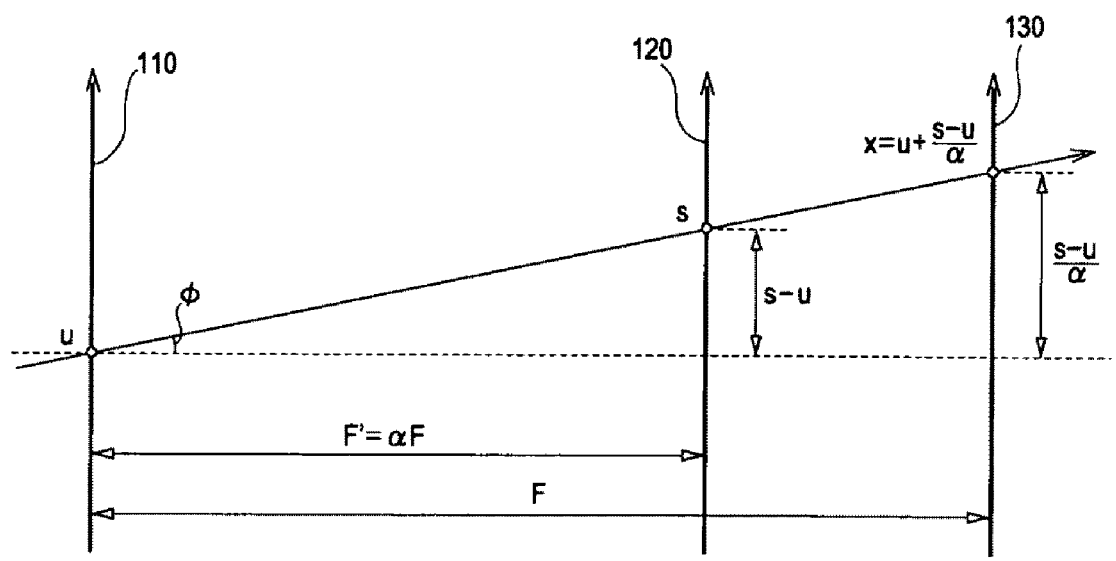
FIG. 7 is a schematic diagram illustrating refocus processing when a reconstructed image obtained for an arbitrary focus is generated.

First, with reference to FIGS. 4 through 7, the basic operation of the image processing unit 14 will be described. FIG. 4 is a diagram for illustrating information regarding a light ray included in the picked-up image data. FIG. 5 schematically shows an image of the shooting subject formed on the light receiving surface. FIGS. 6A and 6B show an example of reconstructed images obtained for arbitrary fields of view. FIG. 7 is a schematic diagram for illustrating refocus processing performed when a reconstructed image obtained for an arbitrary focus is generated.

The picked-up image data D0 input to the image processing unit 14 is represented in the following state. As shown in FIG. 4, a rectangular coordinate system (u, v) is set for an image-pickup lens surface of the image pickup lens 11 and a rectangular coordinate system (x, y) is set for an image-pickup surface of the image pickup element 13. When the distance between the image-pickup lens surface of the image pickup lens 11 and the image-pickup surface of the image pickup element 13 is F, a light ray L1 that passes through the image pickup lens 11 and the image pickup element 13 is represented by a four-dimensional function $L_F(x, y, u, v)$, that is, the light ray L1 is represented in a state in which the direction in which the light ray propagates is maintained in addition to position information regarding the light ray.

The defect correction unit 141 corrects a defect of such picked-up image data D0. After the clamp processing unit 142 sets the black level of the picked-up image data D0 to an appropriate level, color interpolation processing such as demosaic processing is performed. In the sorting processing unit 145, predetermined sorting is performed. Thus, as the picked-up image data Dout, for example, the picked-up image data of an image obtained for an arbitrary field of view or for an arbitrary focus (an arbitrary-visual-point image) is output. In the following, an example of sorting processing will be described in a case in which an image obtained for this arbitrary field of view or for this arbitrary focus is reconstructed.

For example, as shown in FIG. 5, when one microlens is allocated to every pixel area with five rows and five columns (5×5 pixels) arranged on the light receiving surface of the image-pickup element, picked-up image data D100 regarding images of the shooting subject 2 each formed on one of the microlenses (hereinafter such an image is referred to as a unit image) is obtained. In this case, pieces of pixel data at the same position in unit images are extracted and combined, whereby an image obtained for an arbitrary field of view is reconstructed. Here, actual reconstructed images are shown in FIG. 6B when pieces of pixel data in areas (fields of view) S11, S12, S13, S14, and S15 shown in FIG. 6A are extracted and combined. In this way, since the picked-up image data D0 includes information regarding directions in which light rays propagate, images of the shooting subject 2 viewed from different fields of view (arbitrary fields of view) are reconstructed. In addition, in this case, as many reconstructed images as the pixels allocated to one microlens on the light receiving surface of the image-pickup element are obtained, and thus the resolution of the image-pickup element with respect to a reconstructed image obtained for an arbitrary field of view increases as the number of pixels allocated to each of the microlenses increases. On the other hand, the resolution of the reconstructed image increases as the number of pixels allocated to each of the microlenses decreases.

On the other hand, as shown in FIG. 7, when a positional relationship between an image-pickup lens surface 110, an image-pickup element surface 130, and a refocus surface 120 is set (the refocus surface 120 is set to be apart from the image-pickup lens surface 110 by $F'=\alpha F$), the detected intensity $L_{F'}$ on the image-pickup element surface 130 in terms of coordinates (s, t) on the refocus surface 120 is expressed by Eq. (2) given below. Moreover, an image $E_{F'}(s, t)$ obtained on the refocus surface 120 is the integral of the detected intensity $L_{F'}$ with respect to a lens aperture, and is expressed by Eq. (3) given below. Thus, by performing refocus processing according to Eq. (3), an image obtained for an arbitrary focus (the refocus surface 120) is reconstructed.

$$L_{F'}(s, t, u, v) = L_{(\alpha \cdot F)}(s, t, u, v) \qquad (2)$$
$$= L_F\left(u + \frac{s-u}{\alpha}, v + \frac{t-v}{\alpha}, u, v\right)$$
$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

-continued $$E_{F'}(s, t) = \frac{1}{F'^2} \int\int L_{F'}(s, t, u, v) du dv \qquad (3)$$

$$= \frac{1}{\alpha^2 F^2} \int\int L_F\left\{u\left(1-\frac{1}{\alpha}\right) + \frac{s}{\alpha}, v\left(1-\frac{1}{\alpha}\right) + \frac{t}{\alpha}, u, v\right\} du dv$$

Moreover, in the refocus processing, when a reconstructed image is generated which is focused on the shooting subject 2 that was present behind (far from) a focus position set at the time of picking up an image (the position of the microlens array 12), sorting processing is performed in such a manner that light rays that form an image at a position of the shooting subject 2 as a focus position are selectively extracted. In this case, the light rays that have been focused diverge again, and the diverging light rays pass through different microlenses in accordance with directions in which the diverging light rays propagate and reach the image pickup element 13. On the other hand, when a reconstructed image is generated which is focused on the shooting subject 2 that was present before a focus position (a position between the image pickup element 13 and the focus position) set at the time of picking up an image, sorting processing is performed in such a manner that light rays that form an image at a focus position for the shooting subject 2 are selectively extracted. In this case, the image of the shooting subject 2 is not formed in the image pickup apparatus 1, and the light rays pass through different microlenses in accordance with directions in which the light rays propagate and reach the image pickup element 13.

The noise reduction unit 146 performs the noise reduction processing on the picked-up image data of an image, which is reconstructed by the sorting processing unit 145 as described above, obtained for an arbitrary field of view or for an arbitrary focus. In addition, the edge enhancement unit 147 performs the edge enhancement processing on the resulting picked-up image data and supplies it to the white balance adjusting unit 148. The gamma correction unit 149 performs gamma correction on the picked-up image data supplied from the white balance adjusting unit 148, and the resulting picked-up image data is output from the image processing unit 14 as the picked-up image data Dout. Thus, an image obtained for an arbitrary field of view or for an arbitrary focus is obtained using this picked-up image data Dout.

Figure 8:
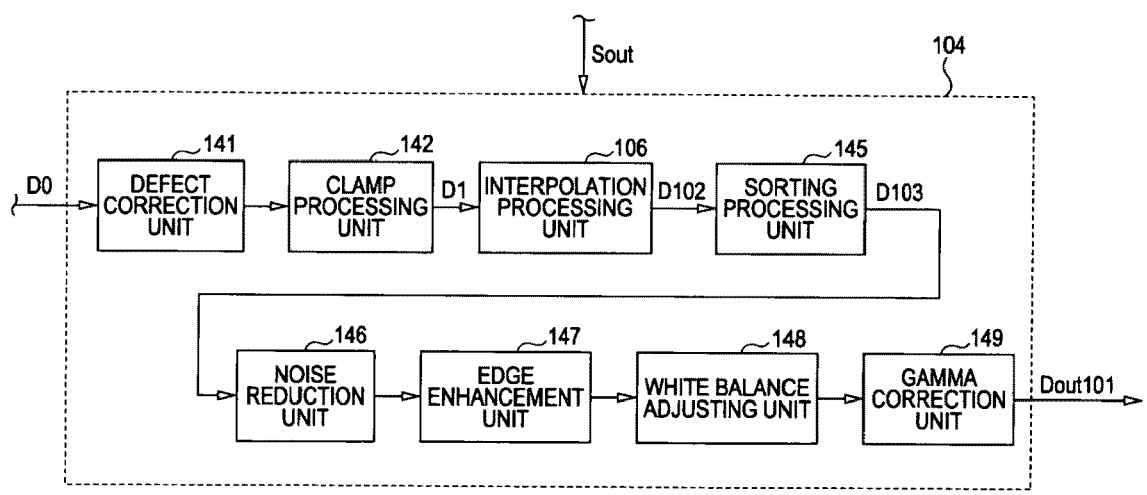
FIG. 8 is a functional block diagram showing an image processing unit of an image pickup apparatus according to a comparative example.
Figure 9:
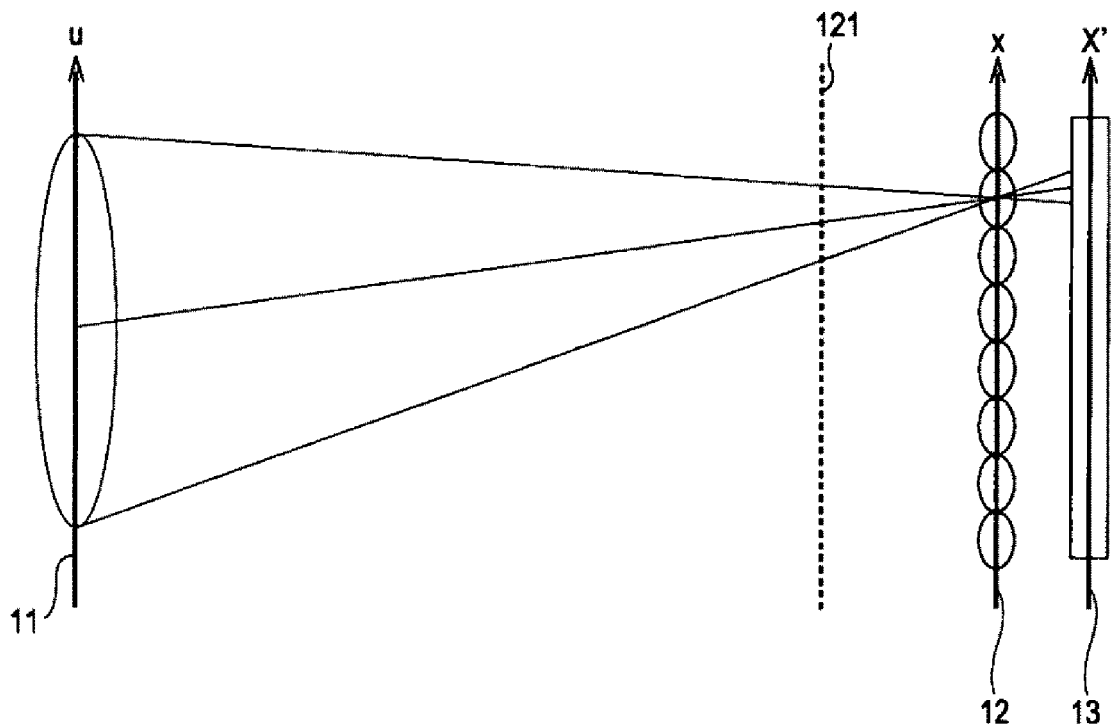
FIG. 9 is a diagram illustrating an operation in the image pickup apparatus according to the comparative example.
Figure 10:
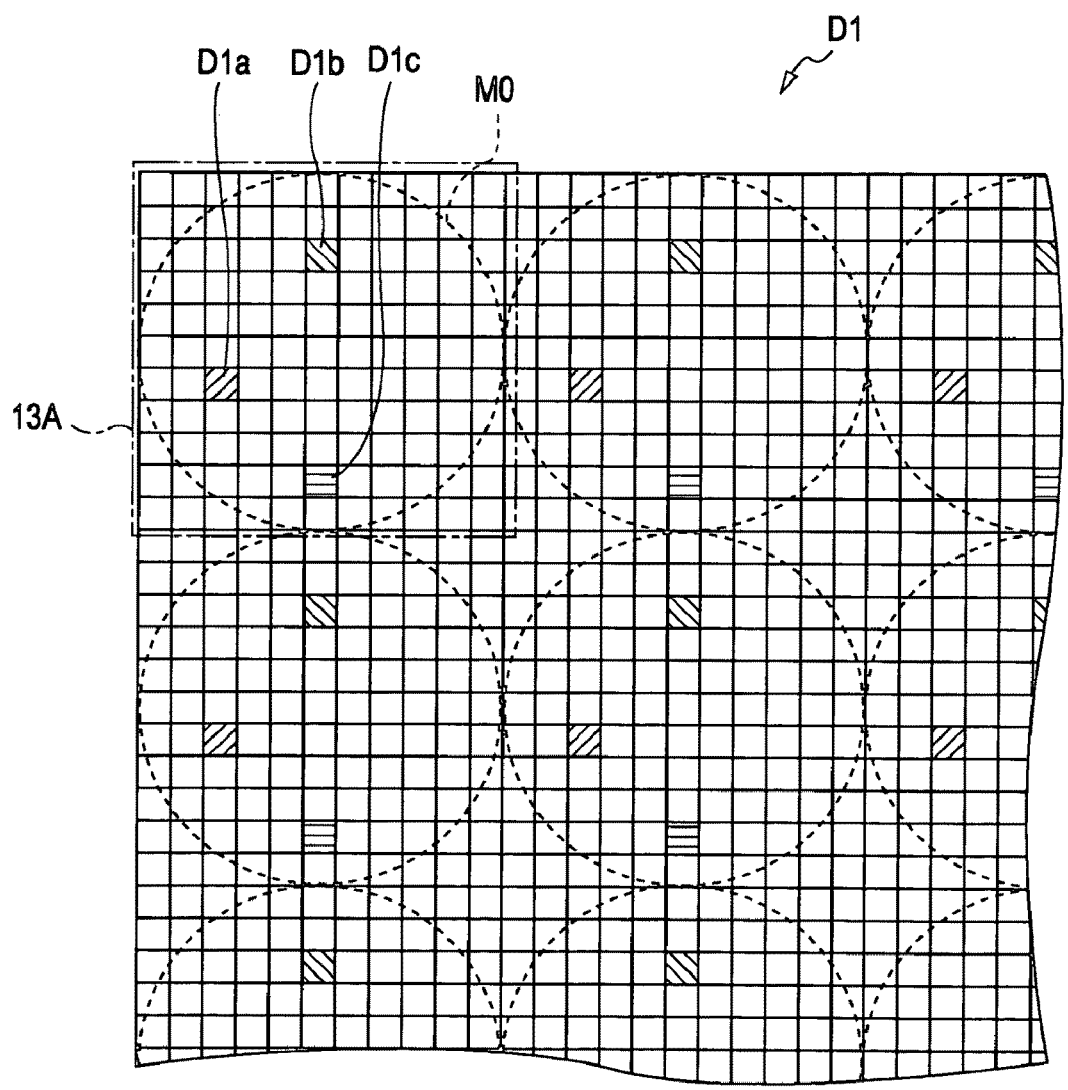
FIG. 10 is a diagram schematically showing a processing operation performed in a parallax component image generation unit of the image processing unit shown in FIG. 3.
Figure 12A:
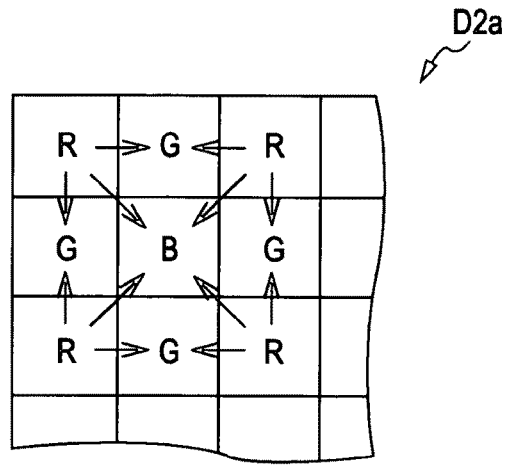
FIGS. 12A through 12C are diagrams schematically showing an example of a color interpolation operation performed in an interpolation processing unit of the image processing unit shown in FIG. 3.
Figure 12B:
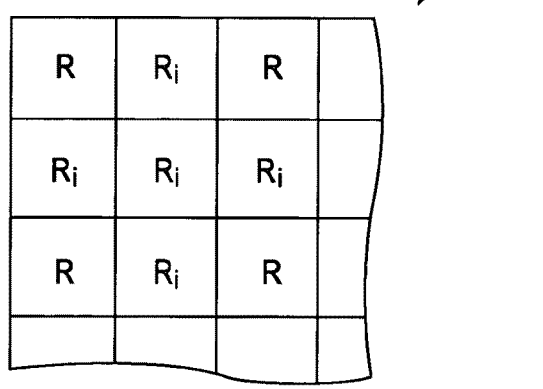
Figure 12C:
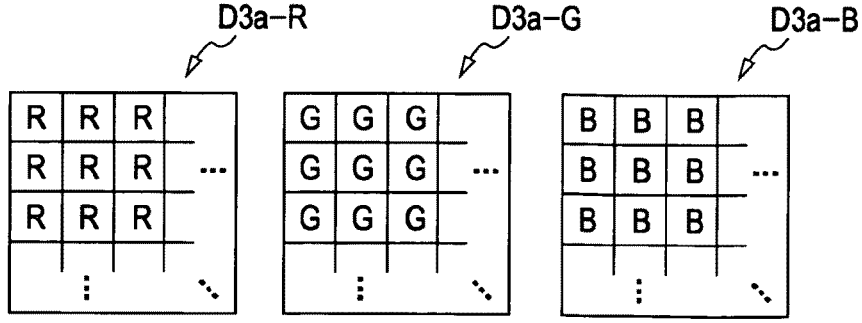
Figure 13:
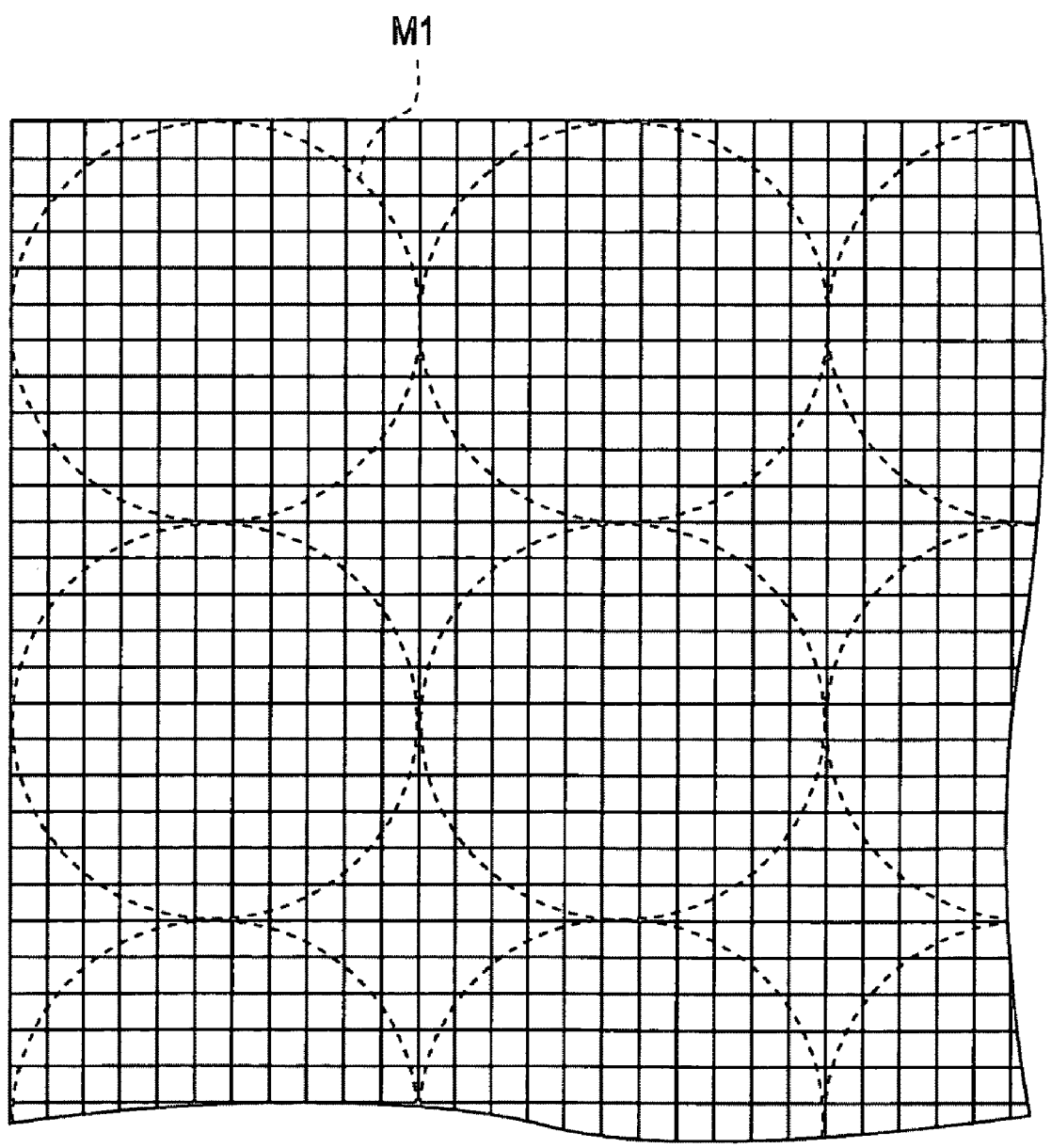
FIG. 13 is a schematic diagram showing picked-up image data on which the rearrangement processing has been performed after the color interpolation.

Next, with reference to FIGS. 8 through 13, the operation of the parallax component image generation unit 143 and the operation of the interpolation processing unit 144 in the image processing unit 14 will be described in comparison with comparative examples. FIG. 8 is a functional block diagram of an image processing unit 104 of an image pickup apparatus according to a comparative example. FIG. 9 is a diagram illustrating an operation in the image pickup apparatus in the comparative example. FIG. 10 is a schematic diagram showing a processing operation in the parallax component image generation unit 143. FIGS. 11A through 11C are schematic diagrams showing the color arrangement of parallax component images. FIGS. 12A through 12C are schematic diagrams showing an example of a color interpolation operation in the interpolation processing unit 144. FIG. 13 is a diagram showing picked-up image data on which rearrangement processing has been performed after the color interpolation.

First, in the image processing unit 104 according to the comparative example shown in FIG. 8, an interpolation processing unit 106 performs the color interpolation on the picked-up image data D1 supplied from the clamp processing unit 142, and thereafter the sorting processing unit 145 performs the sorting processing on picked-up image data (picked-up image data D102). Thus, for example, image data (picked-up image data D103) obtained for an arbitrary field of view or for an arbitrary focus is generated. Here, in the interpolation processing unit 106, for example, for each of the three colors R, G, and B, the color interpolation is performed between adjacent pieces of pixel data. For each of the three colors R, G, and B, the picked-up image data D102 is generated.

Here, as described above, the picked-up image data D0 includes the information regarding the directions in which the light rays propagate in addition to the position information of the light rays. However, these pieces of information are different between adjacent pieces of pixel data, and thus if the color interpolation processing is performed between adjacent pieces of pixel data in the picked-up image data D1 (the picked-up image data D0) as described in this comparative example, correct light intensity is not obtained from the picked-up image data D102. Moreover, the light rays coming from different positions (objects) pass through a defocus surface 121 located at an out-of-focus position as shown in FIG. 9, and thus, appropriate color interpolation is not performed in the color interpolation processing according to the comparative example. Furthermore, when focus adjustment is performed, light vectors become mixed between adjacent pieces of pixel data, and the focus accuracy with respect to images is decreased. Moreover, on the light receiving surface of the image-pickup element, a unit image corresponding to the shape of an opening of the aperture diaphragm is formed for each of the microlenses. Thus, the edge of a unit image (the outer edge portion) is present for every microlens. However, when such an edge is included in the picked-up image data D0, appropriate interpolation processing is not performed between the pixel data including this edge and the adjacent pixel data thereof.

In contrast, in the image processing unit 14 according to the first embodiment of the present invention, as shown in FIG. 3, the parallax component image generation unit 143 is arranged before the interpolation processing unit 144. That is, parallax component images are generated using the picked-up image data (the picked-up image data D1) supplied from the clamp processing unit 142, and thereafter, for each of the parallax component images, the color interpolation processing is performed on the pixel data of the parallax component image. Thus, the picked-up image data D3, which is obtained after the color interpolation processing, is generated. The predetermined processing described above is performed on this picked-up image data D3 by the sorting processing unit 145, the noise reduction unit 146, the edge enhancement unit 147, the white balance adjusting unit 148, and the gamma correction unit 149, and the picked-up image data Dout is output. In the following, the operation of the parallax component image generation unit 143 and the operation of the interpolation processing unit 144 will be specifically described.

In the parallax component image generation unit 143, first, as shown in FIG. 10, in the picked-up image data D1, pixel data at predetermined positions, for example, pixel data D1a, D1b, D1c, and the like are extracted from each of the pixel areas 13A, each of which corresponds to a unit image M0 formed on one of the microlenses. Here, the predetermined positions in one of the pixel areas 13A are the same as those in a different one of the pixel areas 13A. Next, the pieces of the pixel data D1a are combined to generate the picked-up image data of a parallax component image (picked-up image data D2a described below), the pieces of the pixel data D1b are combined to generate the picked-up image data of a parallax component image (picked-up image data D2b described below), and the pieces of the pixel data D1c are combined to generate the picked-up image data of a parallax component image (picked-up image data D2c described below). Similarly, the picked-up image data of as many parallax component images as all pixels in the pixel area 13A corresponding to the unit image M0 (hereinafter collectively referred to as the picked-up image data D2) is generated. Thus, as many parallax component images as the number of pixel data in the pixel area 13A, that is, the number of pixels allocated to each of the microlenses are generated. For example, according to the first embodiment of the present invention, pixels with 11 rows and 11 columns are allocated to each of the microlenses. Thus, 121 parallax component images are generated. In the parallax component images generated in this way, the positions of light rays and the directions in which the light rays propagate are the same for adjacent pieces of pixel data.

On the other hand, since the pixels are each allocated one of the three colors of the color filter 15, pixel data of the color R, G, or B is arranged for every pixel in the picked-up image data D1. Moreover, if the larger one of the number of rows and the number of columns for the unit array 15A of the color filter 15 is represented by n (if the number of rows and the number of columns are the same, n is both the number of rows and the number of columns), the number of pixels $N_p$ along one side of the pixel area 13A corresponding to one of the microlenses is expressed by Eq. (1) given above. With such a configuration, as shown in FIGS. 11A through 11C, the color arrangement in the picked-up image data D2a of the parallax component image generated by combining the pieces of the extracted pixel data D1a, the color arrangement in the picked-up image data D2b of the parallax component image generated by combining the pieces of the extracted pixel data D1b, and the color arrangement in the picked-up image data D2c of the parallax component image generated by combining the pieces of the extracted pixel data D1c are the same as the color arrangement of the unit array (the unit array 15A) of the color filter 15. Here, in the first embodiment of the present invention, an example is shown in which the number of rows (columns) n of the unit array 15A of the color filter 15 is two and m is four.

When the generated picked-up image data D2 is supplied to the interpolation processing unit 144, the color interpolation processing is performed on the picked-up image data of each of the parallax component images by the interpolation processing unit 144. For example, the color interpolation processing is performed on the picked-up image data D2a as shown in FIG. 12A, whereby red picked-up image data D3a-R is obtained as shown in FIG. 12B. Similarly, the color interpolation processing is performed with respect to green and blue, whereby the red picked-up image data D3a-R, green picked-up image data D3a-G, and blue picked-up image data D3a-B are obtained as shown in FIG. 12C. In this way, for each of all parallax component images, the color interpolation processing is performed on the picked-up image data of the parallax component image, and thus the picked-up image data D3, which is obtained after the color interpolation processing, is generated.

Here, in the picked-up image data of each of the parallax component images, as described above, since the positions of light rays and the directions in which the light rays propagate are the same for adjacent pieces of pixel data. Thus, by performing the color interpolation processing on each of the parallax component images, the color interpolation is realized while the information regarding the positions of light rays and the directions in which the light rays propagate are properly maintained. Moreover, since the color arrangement of the unit array of the color filter 15 and the color arrangement of the unit array of the picked-up image data D2 of the parallax component images are the same, the color information held in the original picked-up image data D0 is not lost even if the color interpolation processing is performed using the parallax component images that are generated by combining pieces of the pixel data at predetermined positions extracted from the picked-up image data D0 (D1) obtained by the image pickup element 13.

Here, when the picked-up image data D3 obtained after the color interpolation processing is supplied to the sorting processing unit 145, the sorting processing unit 145 performs rearrangement processing thereon as preprocessing of the sorting processing. Thus, the picked-up image data D3 of the parallax component images obtained after the color interpolation processing is rearranged into an image corresponding to the original picked-up image data D0, and the picked-up image data of unit images M1 is obtained as shown in FIG. 13. The picked-up image data of the unit images M1 becomes an image containing the color information of three colors R, G, and B for each of the pixels in the picked-up image data D0.

As described above, in the first embodiment of the present invention, since the color filter 15 which is allocated colors in units of the unit array 15A on the light receiving surface of the image pickup element 13, the picked-up image data D0 including information regarding the positions of the light rays and the directions in which the light rays propagate obtained by the image pickup element 13 can be pixel data of a plurality of colors corresponding to the color arrangement of the color filter 15. Moreover, in the image processing unit 14, since the parallax component images are each generated using the pixel data arranged at the same position in the pixel areas 13A corresponding to the microlenses, the positions of light rays and the directions in which the light rays propagate can be the same for adjacent pieces of pixel data in each of the parallax component images. Thus, the color interpolation processing can be performed while the information regarding the positions of light rays and the directions in which the light rays propagate are properly maintained.

Figure 14:
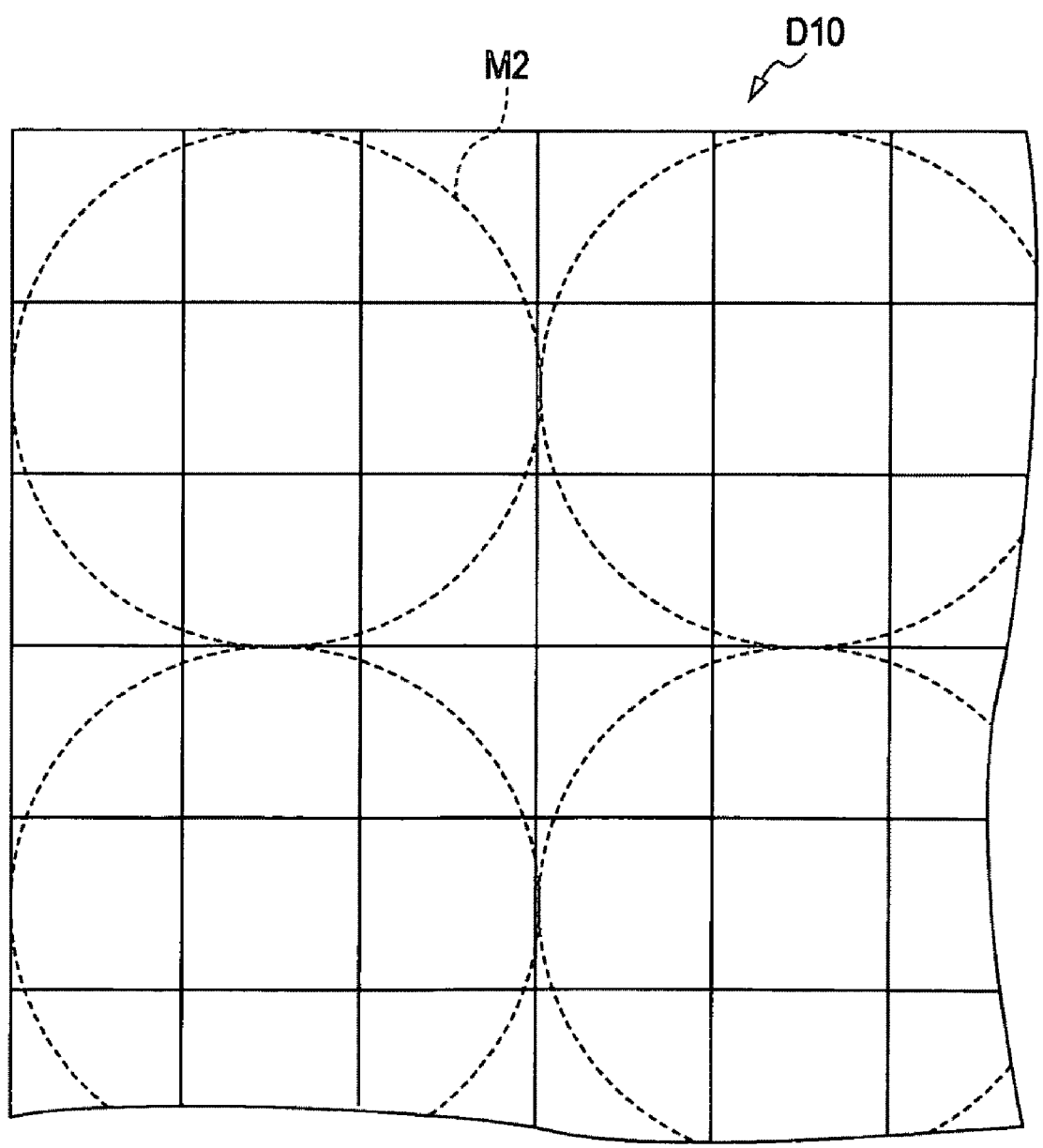
FIG. 14 is a schematic diagram showing a structure of picked-up image data when the number of pixels allocated to each of the microlenses is reduced.

Moreover, in the picked-up image data D0, the edge of a unit image is present for every microlens; however, parallax component images are generated before the color interpolation processing is performed on this picked-up image data D0, and thus the effect of the edge that is present for every microlens can be greatly reduced. Thus, proper color interpolation processing can be easily performed. This is especially effective when the number of pixels allocated to each of the microlenses is reduced as shown in FIG. 14, for example, the number of pixels is 3×3=9. This is because, when the number of pixels allocated thereto decreases, the number of edges in unit images M2 increases and the effect of the edges increases.

Here, since the color arrangement of the unit array of the color filter 15 and the color arrangement of the unit array of the parallax component images are the same, the color information regarding the picked-up image data D0 obtained by the image pickup element 13 is not lost. Thus, the proper color interpolation processing can be performed on the picked-up image data including information regarding the propagation of light rays. This prevents an error from occurring in brightness between a reconstructed image and an actual image, and prevents the color balance from being lost.

Second Embodiment

Next, a second embodiment of the present invention will be described with reference to the attached drawings. Here, the same components as those indicated in the first embodiment will be denoted by the same reference numerals, and the description thereof will be omitted as appropriate.

Figure 15:
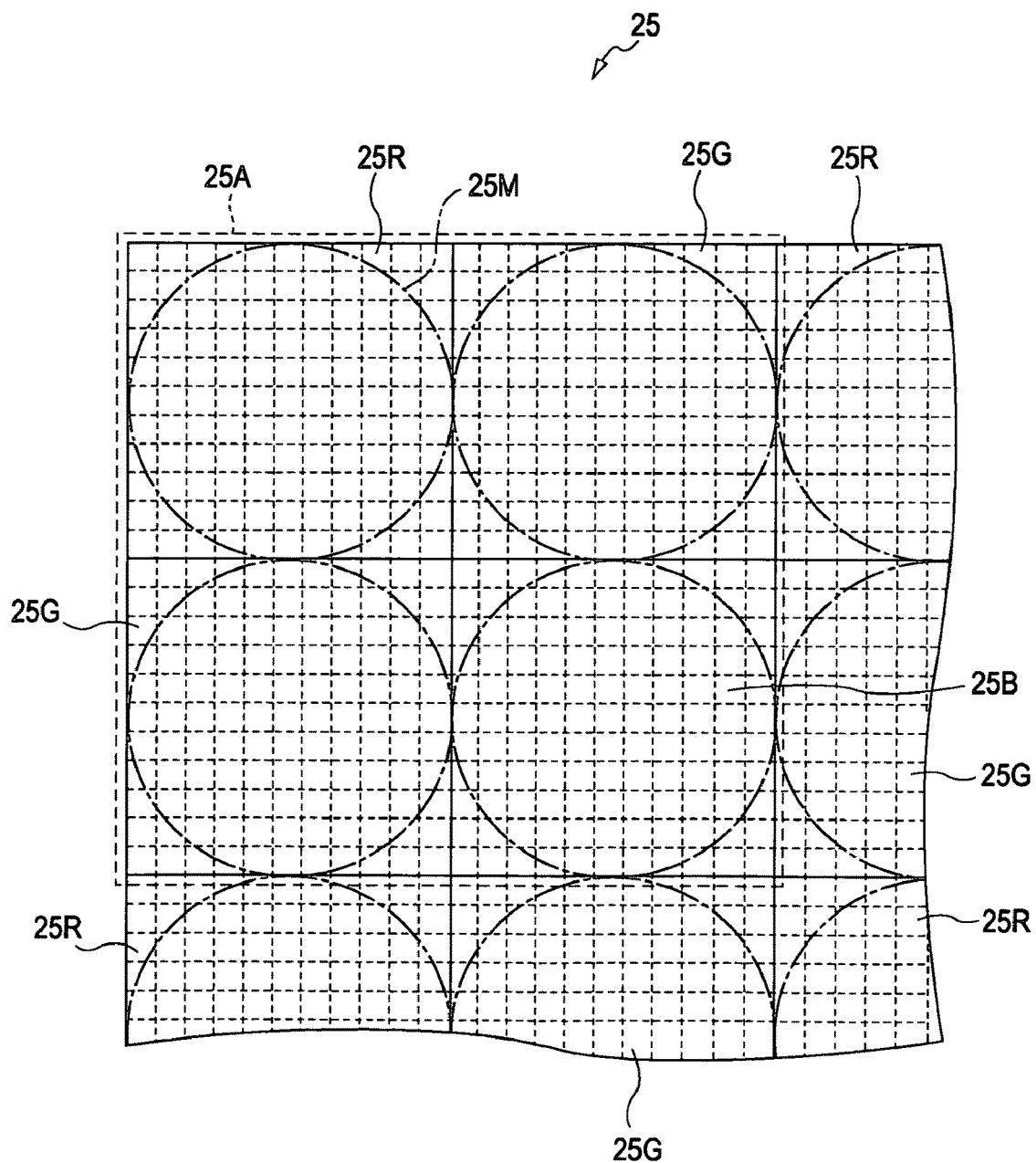
FIG. 15 is a plan view showing an exemplary structure of a color filter used in an image pickup apparatus according to a second embodiment of the present invention.

FIG. 15 shows a structure of a color filter 25 used in an image pickup apparatus according to the second embodiment. The color filter 25 is arranged on the light receiving surface of the image pickup element 13 as shown in FIG. 1, and is a primary color filter with a Bayer pattern in which three primary color filters (a red color filter 25R, a green color filter 25G, and a blue color filter 25B) for red (R), green (G), and blue (B) are arranged in a mosaic pattern in the ratio of R:G:B=1:2:1. That is, such three color filters are periodically arranged in units of a unit array 25A with two rows and two columns.

Moreover, in the second embodiment, pixel areas (25M) corresponding to microlenses are each allocated one of the colors of the color filter 25. That is, the red color filter 25R, the green color filter 25G, and the blue color filter 25B are each allocated corresponding sets of pixels (for example, a pixel area with 11 rows and 11 columns) that are allocated to one of the microlenses.

Since such a color filter 25 is provided on the light receiving surface of the image pickup element 13, pixel data of a plurality of colors corresponding to the colors of the color filter 25 is obtained as the picked-up image data D0 obtained by the image pickup element 13. Here, the colors R, G, and B are each allocated to corresponding pixel areas that correspond to microlenses. Thus, by extracting and combining pieces of pixel data arranged at the same position in the pixel areas by the above-described parallax component image generation unit 143, all parallax component images have the same color arrangement (for example, the arrangement shown in FIG. 11A) and the unit array of the parallax component images is the same as the unit array 25A of the color filter 25. Thus, advantages similar to those obtained in the first embodiment can be obtained.

Since the pixel areas corresponding to the microlenses are each allocated one of the colors of the color filter 25 on the light receiving surface of the image pickup element 13, the number of pixels allocated to each of the microlenses can be set without a limitation such as Eq. (1) given above. Thus, design flexibility can be increased compared with the first embodiment.

In the above, the first embodiment and the second embodiment of the present invention are described; however, the present invention is not limited to these embodiments and various modifications are permissible.

For example, in the above-described embodiments, an example of a structure in which 11×11 pixels are allocated to each of the microlenses; however, the number of pixels allocated to each of the microlenses is not limited thereto. Here, the less number of pixels is allocated to each of the microlenses, the higher resolution of a reconstructed image is obtained, and the greater number of pixels is allocated to each of the microlenses, the higher resolution of the image-pickup element is obtained with respect to a reconstructed image.

Moreover, in the above-described embodiments, in the parallax component image generation unit 143, a case has been described in which as many parallax component images as the number of pixel data (11×11=121) corresponding to the entire pixel area 13A are generated; however, the present invention is not limited thereto. Parallax component images may be generated using only pixel data in the area (when the opening of the aperture diaphragm of the image pickup lens 11 is a circular shape, the area is circular) corresponding to a unit image formed by a microlens. In this case, the peripheral pixel area of the unit image is an area that does not practically receive light (hereinafter referred to as a "non-light-receiving area"). Thus, for example, in the image processing unit 14, an area extraction unit that performs processing in which a light receiving area is extracted and a non-light-receiving area is eliminated from the picked-up image data D0 is provided between the defect correction unit 141 and the clamp processing unit 142. With such a configuration, since image processing to be performed thereafter (especially, white balance adjustment processing) can be performed using only data that practically receives light, the color balance can be more natural.

Moreover, in the above-described embodiments, in the unit array of the color filter 15, an example of a structure in which the number of rows and the number of columns are even numbers has been described; however, the present invention is not limited thereto and they may be odd numbers.

Moreover, in the above-described embodiments, in the sorting processing unit 145, an example in which the rearrangement processing, as the preprocessing of the sorting processing, is performed on the picked-up image data D3 obtained after the color interpolation processing has been described; however, the present invention is not limited thereto. It is not necessary to perform this rearrangement processing before some types of sorting processing in the sorting processing unit 145. That is, even when predetermined sorting processing is simply performed on parallax component images obtained after the color interpolation processing, advantages according to an embodiment of the present invention can be obtained.

Figure 16:
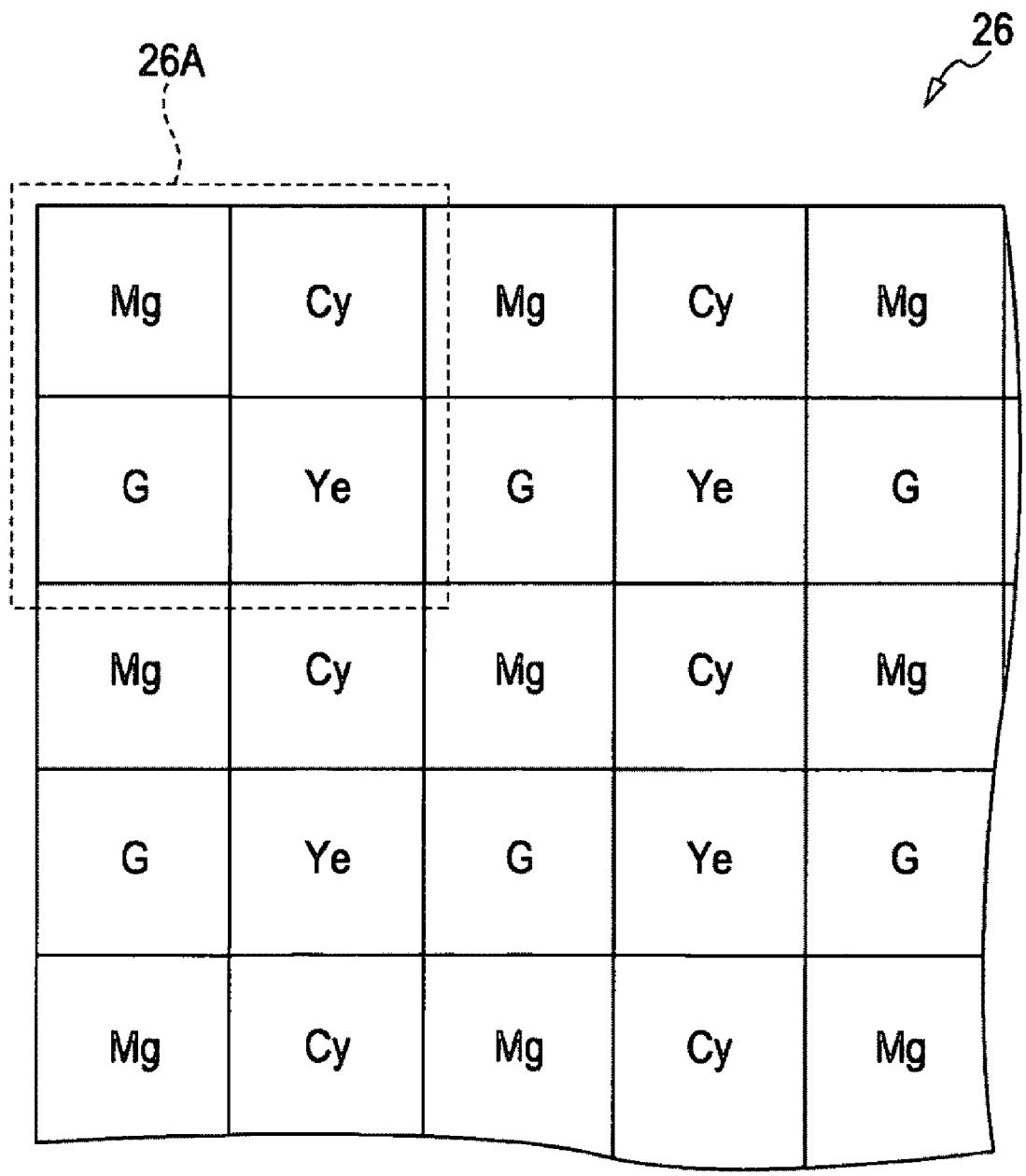
FIG. 16 is a plan view showing a structure of a color filter according to an exemplary modification of the present invention.

Moreover, in the above-described embodiments, as an example of a color filter, the color filter (the primary color filter) with the Bayer pattern has been described in which the three primary color filters for red (R), green (G), and blue (B) are arranged in a mosaic pattern in the ratio of R:G:B=1:2:1. However, a color filter having a different arrangement may be used such as, for example, a color filter 26 shown in FIG. 16. Here, this color filter 26 is a color filter in which four complementary color filters for yellow (Ye), magenta (Mg), cyan (Cy), and green (G) are arranged in a mosaic pattern (complementary-color mosaic pattern) in the ratio of Ye:Mg:Cy:G=1:1:1:1. A unit array 26A thereof has two rows and two columns.

Figure 17:
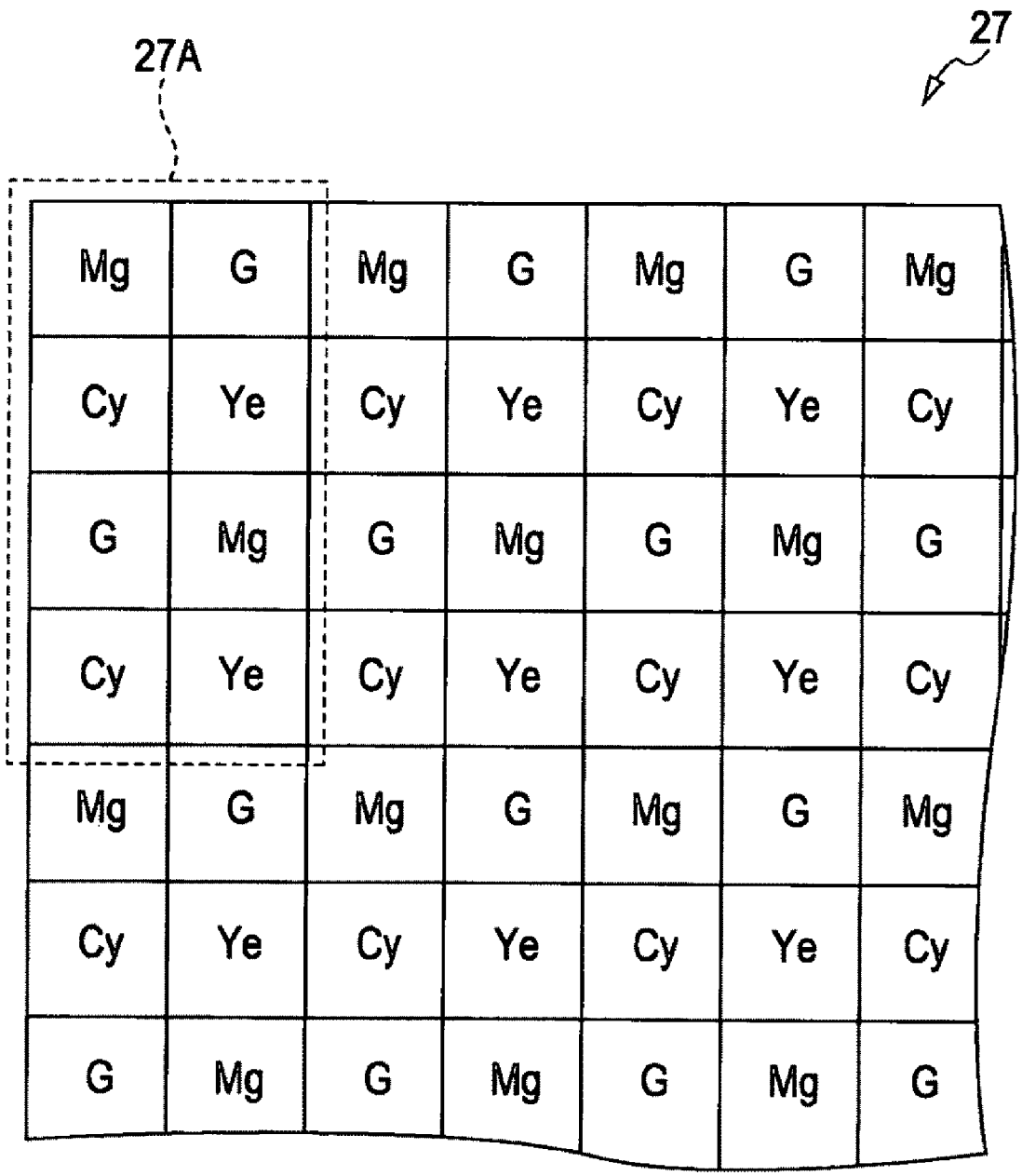
FIG. 17 is a plan view showing a structure of a color filter according to an exemplary modification of the present invention.

Alternatively, a color filter 27 shown in FIG. 17 may be used. This color filter 27 is a filter in which the four complementary colors are arranged in the ratio of Ye:Mg:Cy:G=1:1:1:1 similarly to that shown in FIG. 16; however, a unit array 27A thereof has four rows and two columns. Here, similarly to the first embodiment, when the pixels are each allocated one of colors of the color filter 27, the number of pixels $N_p$ along one side of a pixel area that is allocated to one of the microlenses is set by setting n to four in Eq. (1) given above.

Moreover, in the above-described embodiments, the demosaic processing has been described as an example of the color interpolation processing for the pixel data in the picked-up image data; however, other color interpolation processing may be performed.

Furthermore, in the above-described embodiments, the refocus processing utilizing "Light Field Photography" has been described as an example of the sorting processing performed in the image processing unit 14; however, the present invention is not limited thereto. For example, the present invention may be applied to defocus processing or depth-of-field adjustment processing.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image-pickup lens having an aperture diaphragm;
   an image-pickup element that has a color filter which is periodically allocated a plurality of colors in units of a predetermined unit array and that generates picked-up image data including pixel data of a plurality of colors using received light, the color filter being adjacent to a light receiving surface;
   a microlens array unit that is arranged on an image forming surface of the image-pickup lens and whose microlenses are each allocated a plurality of pixels of the image-pickup element; and
   an image processing unit that performs image processing on the picked-up image data generated by the image-pickup element,
   wherein the image processing unit includes
      a parallax component image generation unit that generates a plurality of parallax component images, each of which is generated by extracting pieces of pixel data that are arranged at the same position in pixel areas corresponding to the microlenses in the picked-up image data and combining the pieces of extracted pixel data that are arranged at the same position, and
      an interpolation processing unit that performs color interpolation processing on each of the parallax component images, and
   wherein the color arrangement of the unit array of the color filter is the same as the color arrangement of the unit array in pixel data constituting each of the parallax component images, the unit array containing a plurality of colors.

2. The image pickup apparatus according to claim 1, wherein the pixels of the image-pickup element are each allocated one of the colors of the color filter.

3. The image pickup apparatus according to claim 2, wherein if the larger one of the number of rows and the number of columns for the unit array of the color filter is represented by n (if the number of rows and the number of columns are the same, n is both the number of rows and the number of columns), the number of pixels $N_p$ along one side of a pixel area corresponding to one of the microlenses is expressed by the following expression, $N_p = (n+1) + n \times m$ (where m=0, 1, 2, 3, ...).

4. The image pickup apparatus according to claim 1, wherein, pixel areas corresponding to the microlenses are each allocated one of the colors of the color filter.

5. The image pickup apparatus according to claim 1, wherein the color filter is a primary color filter having red (R), green (G), and blue (B) as the colors.

6. The image pickup apparatus according to claim 5, wherein the unit array of a plurality of colors of the color filter has a Bayer pattern in which red (R), green (G), and blue (B) are arranged in a mosaic pattern in the ratio of R:G:B=1:2:1.

7. The image pickup apparatus according to claim 1, wherein the color filter is a complementary color filter having yellow (Ye), magenta (Mg), cyan (Cy), and green (G) as the colors.

8. The image pickup apparatus according to claim 1, wherein, for each of the parallax component images, the image processing unit rearranges pieces of pixel data constituting the parallax component image obtained after the color interpolation processing in such a manner that the pieces of the pixel data are each arranged at a predetermined position in corresponding one of the pixel areas corresponding to the microlenses.

* * * * *